(No Model.)
E. PATTERSON.
TIRE UPSETTER.
No. 341,937. Patented May 18, 1886.
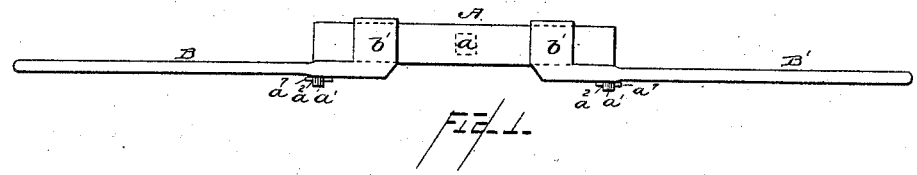
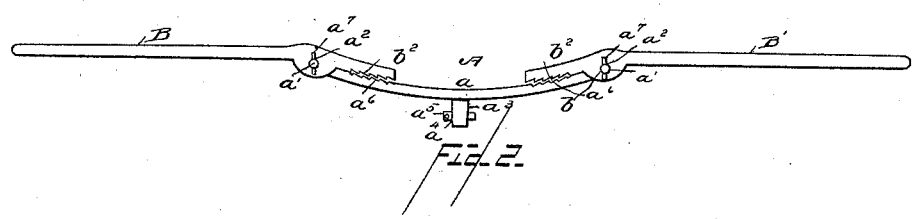
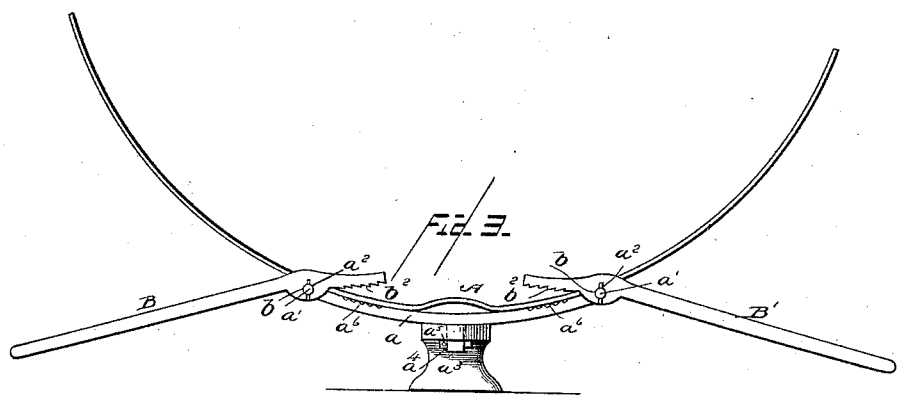
Witnesses
D. W. Dashiell
E. G. Eggers
Inventor
Ellis Patterson.
By his Attorneys
C. A. Snow & Co
N. PETERS, Photo-Lithographer, Washington, D. C.

UNITED STATES PATENT OFFICE.

ELLIS PATTERSON, OF CARTERSVILLE, GEORGIA.

TIRE-UPSETTER.

SPECIFICATION forming part of Letters Patent No. 341,937, dated May 18, 1886.

Application filed February 8, 1886. Serial No. 191,220. (No model.)

*To all whom it may concern:*

Be it known that I, ELLIS PATTERSON, a citizen of the United States, residing at Cartersville, in the county of Bartow and State of Georgia, have invented a new and useful Improvement in Tire - Shrinking Machines, of which the following is a specification, reference being had to the accompanying drawings.

My invention relates to tire-shrinking machines, having for its object the provision of an article of the class named adapted to be used in connection with the ordinary smith's anvil.

To this end the invention consists in the construction, arrangement, and combination of the several parts, substantially as hereinafter described, and specifically pointed out in the claims.

Referring to the drawings, in which similar letters of reference denote similar parts, Figure 1 represents a plan view of a tire-shrinking device embodying my improvement. Fig. 2 is a side elevation thereof. Fig. 3 is a view showing the device in position upon an anvil, and a tire held within the jaws of the shrinking device in position to be operated upon.

In the drawings, A designates the tire-shrinking device, consisting of a curved plate, $a$, provided at its ends, upon one side thereof, with projecting studs $a'$, having apertures $a^2$ at or near the other outer ends thereof.

$a^3$ designates a stud or pin projecting from the lower surface of the bar $a$ at a point intermediate of its ends. This stud is square in cross-section, and is provided at its lower end with an aperture, $a^4$, to receive a key, $a^5$, that secures the device to an anvil, as hereinafter described.

B B' designate levers, each of which is provided near one end with apertures $b$, whereby they are mounted upon the studs $a'$ of the bar $a$. The inner end of each of said levers is provided with a laterally-projecting lug or ear, $b'$, the lower surface of which is corrugated or serrated, as shown at $b^2$, for the purpose of holding, in conjunction with corrugations $a^6$, formed upon the upper surface of the bar, a tire in position to be operated upon.

The levers B B' are held in position upon the studs $a'$ by pins $a^7$, that pass through the apertures $a^2$ outside of said levers.

The operation of my device is as follows: The plate $a$ is placed upon a smith's anvil with its downwardly-projecting stud $a^3$ projecting through a square aperture formed in said anvil and keyed therein. The tire to be operated upon is now, after being properly heated, placed upon the upper surface of the bar $a$, below the lugs or ears $b'$ of the levers B B', and is held firmly in position by pressure applied to said lugs through the levers B B' by the smith and his helper.

Modifications in details of construction may be made in the herein-described invention without departing from the spirit or sacrificing the advantages thereof—as, for instance, the levers B B' may be journaled between lugs formed upon the upper surface of the bar $a$, at each end thereof, and be provided at their ends, at each side thereof, with laterally-projecting lugs corresponding to the lugs or ears $b'$, hereinbefore described, which lugs shall bear or rest upon lugs projecting from the opposite sides of the bar $a$, beneath.

Having thus described my invention, I claim—

1. In a tire-shrinking device, a body, $a$, provided at its ends with laterally-projecting studs to receive levers B B', and at its middle with a downwardly-projecting spur, provided at its lower end with an aperture to receive a key, whereby it is secured to an anvil, substantially as described.

2. In a tire-shrinking device, and in combination with the body $a$ thereof, levers B B', provided upon their inner ends, at one side thereof, with laterally-projecting lugs, said levers mounted upon studs projecting from the body A, and adapted, in conjunction with said body, to hold the tire in position to be operated upon, substantially as described.

3. In a tire-shrinking device, the combination of the following - named elements: body $a$, provided at its ends with laterally-projecting apertured studs $a'$, and at its middle with a downwardly-projecting stud, $a^3$, having an apertured lower end, key $a^5$, levers B B', having laterally-projecting lugs $b'$, provided upon their lower surfaces with corrugations, substantially as described, for the purpose specified.

In testimony that I claim the foregoing as my own I have hereto affixed my signature in presence of two witnesses.

ELLIS PATTERSON.

Witnesses:
R. H. DODD,
J. D. THOMAS.